April 26, 1927.
W. M. HEINA
1,626,464
PORTABLE RADIO APPARATUS
Filed Sept. 16, 1926
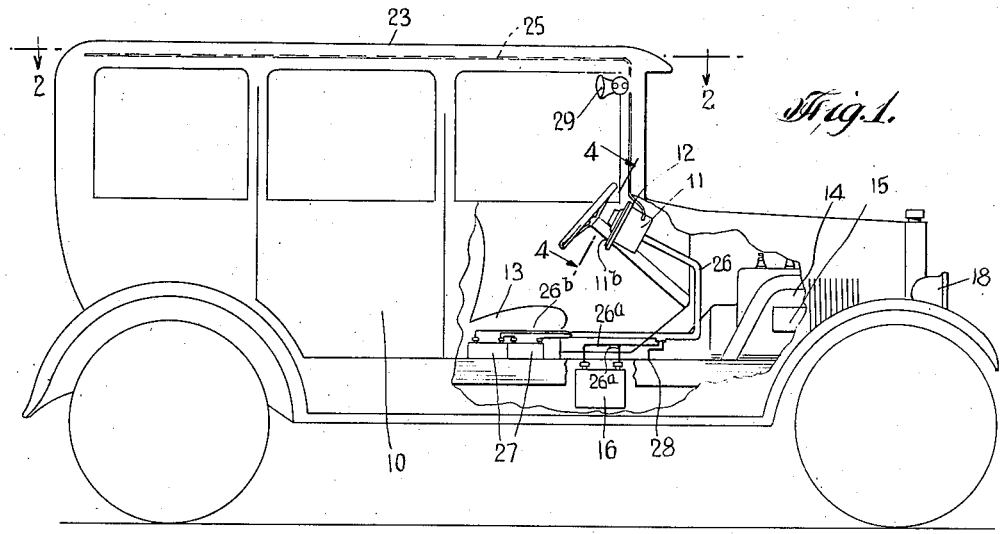
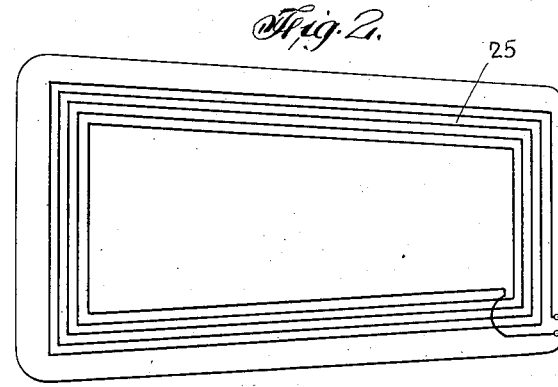
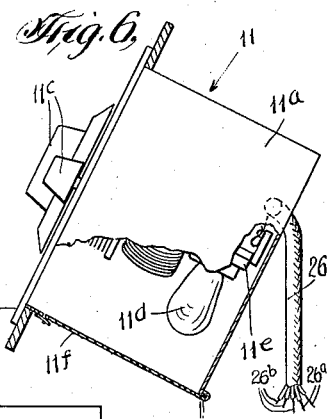
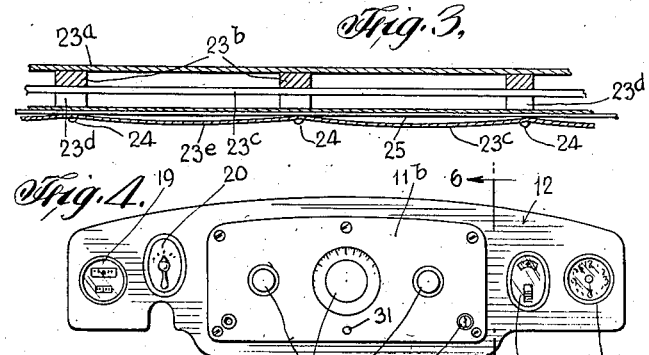
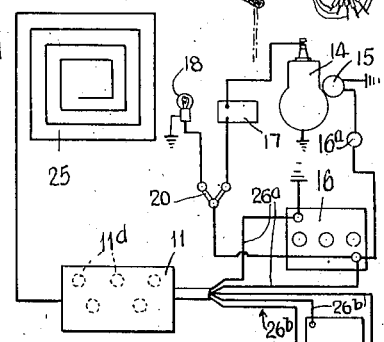
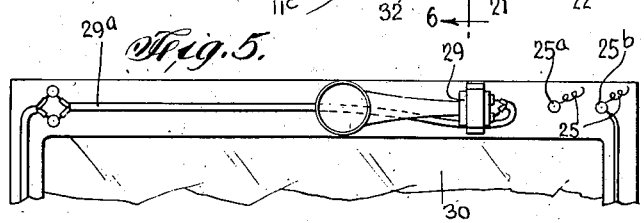
INVENTOR
William M. Heina.
BY
ATTORNEY Patented Apr. 26, 1927.

1,626,464

UNITED STATES PATENT OFFICE.

WILLIAM M. HEINA, OF BRONX, NEW YORK, ASSIGNOR TO HEINA RADIO CORPORATION, A CORPORATION OF NEW YORK.

PORTABLE RADIO APPARATUS.

Application filed September 16, 1926. Serial No. 135,823.

This invention relates to improvements in portable radio apparatus.

An object of the invention is generally to provide portable radio apparatus in the form of an installation in motor vehicles, as for example passenger cars, among the dominant features of the invention being the construction, location, and arrangement of the various parts of the radio apparatus in such manner as to afford a high degree of efficiency in operation without marring the appearance of the car or interfering with the ease and convenience of manipulating the various car mechanisms and devices.

Another object of the invention is to provide an installation of the character described which shall utilize the electrical power ordinarily provided in the motor vehicle and otherwise utilize the vehicle structure so as to afford a high degree of economy and efficiency in construction and operation of the radio apparatus.

A further object of the invention is to provide in a motor vehicle a dashboard adapted to support the various parts of a radio apparatus including the control panel in such manner as not to interfere with the location and manipulation of the various instruments and mechanisms ordinarily operated from the automobile dashboard.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a side elevational view of a closed type of passenger automobile, partly broken away to show the radio apparatus installation.

Fig. 2 is a cross-sectional view taken on line 2—2 in Fig. 1, showing one form of the antenna.

Fig. 3 is a fragmentary cross-sectional view showing in detail the method of mounting the antenna in the top structure of the car.

Fig. 4 is a front elevational view of the automobile dashboard with parts of the radio apparatus mounted thereon.

Fig. 5 is a fragmentary front elevational view of the interior front side of the car body showing the mounting for the radio loud speaker.

Fig. 6 is an enlarged cross-sectional view taken on line 6—6 in Fig. 4, portions of the radio receiving set casing being broken away to show the interior construction.

Fig. 7 is a diagrammatic view of the automobile power plant, generator, storage battery and their circuit connections with the radio apparatus.

Referring in detail to the drawing, the improved portable radio apparatus is seen to comprise a closed type of passenger automobile 10 of any standard construction in which a radio receiving set indicated generally at 11 is mounted on the dashboard 12 in front of the driver's seat 13. Said automobile is provided with the usual power plant comprising a propelling motor 14 which has coupled thereto a suitable generator 15 for supplying electric power to a storage battery 16 through a cut out $16^a$, ignition apparatus 17, and electric lights 18, in the well understood manner.

The dashboard may be arranged to carry the various operating accessories, such as the speedometer 19, light and ignition switch 20 at one end, a combination ammeter and gasoline register 21 and a clock 22 on the other end, the receiving set 11 which is preferably housed in a casing $11^a$ and provided with a control panel $11^b$ being mounted on the dashboard so that the operating knobs $11^c$ on the control panel are within easy reach of the driver.

The top or roof 23 of the car 10 may comprise an outer weather-proof covering $23^a$ made of any suitable material, a bracing structure comprising cross-braces $23^b$ and longitudinally extending laths $23^c$ and spacing strips $23^d$ fastened to said structure against which the inner upholstery or covering $23^e$ is secured in any suitable manner, as by nails 24.

As shown in Figs. 1 to 3 inclusive, an antenna 25 for the radio apparatus 11 is preferably installed between said coverings $23^a$ and $23^e$ of said roof 23 being thus naturally concealed from view. Said antenna may extend about said roof structure to form a loop or may be of any other approved form, the ends of the antenna being terminated in exposed binding posts 25ᵃ and 25ᵇ so that it may be connected in circuit with the set 11 as a loop, or left with an open end, in the well understood manner. Since the upright and roof portions of most automobile bodies are of wooden construction, the antenna when installed in the roof structure is best located for receiving or transmitting radio signals because it is thus furthest removed and insulated from all shielding parts of the automobile. The antenna thus mounted on the bracing structure of the roof eliminates all superstructure or parts projecting or extending in and out of the car. By incorporating the antenna in the roof structure, ample space is furthermore provided for constructing the antenna relatively long and for positioning it so as to be free from directional effects.

A conductor cable 26 for the set 11 extends from the casing 11ᵃ and is preferably carried behind the dashboard. Said cable by means of its conductor wires 26ᵃ connects with the storage battery 16 which serves as the "A" battery for the set 11. The cable conductor wires 26ᵇ connect the "B" battery 27 positioned under the seat 13, one of the conductor wires 26ᵃ being secured at 28 on the chassis frame of the automobile to serve as a ground. Thus, the entire metallic framework of the automobile forms a substantial ground counterpoise.

The set 11 may be provided with radio tubes 11ᵈ which in the construction shown in the drawing, preferably are mounted in sockets 11ᵉ in a depending position in the casing 11ᵃ. Any suitable provision may be made for replacing said tubes, as for example by constructing the casing 11ᵃ with the bottom hinged cover 11ᶠ which makes the interior of the casing easily accessible.

A loud speaker 29 may be suitably mounted within the car body over the front wind shield 30 and connected to the set 11 through conductor wire 29ᵃ, as shown in Fig. 5.

If desired, the set 11 may be provided with a jack 31 for connecting ear telephones (not shown) in circuit and a key switch 32 for locking the set against unauthorized use, both the jack and switch being mounted on the panel 11ᵇ, as shown in Fig. 4.

A dominant feature of the invention resides in the facility with which the radio apparatus may be incorporated in an automobile so as to provide a highly practical and efficient portable radio set. The invention may be applied to the automobile as part of its construction when originally manufactured, in which event the antenna may be installed in the roof structure at comparatively little additional expense, and the dashboard may be constructed originally, as above described, to serve as a mounting for the radio set. The invention may likewise be applied to already manufactured automobiles of standard construction, such as shown in the drawing, simply by mounting the antenna on the bracing structure interiorly of the roof upholstering or covering, then replacing the dashboard or by modifying the same into one adapted to support the control and indicating devices for both the automobile and the radio apparatus, and connecting the radio circuit to receive the power from the storage battery of the power plant, as above described.

In using the invention, the radio set and antenna are installed in the car as described above leaving the interior of the car free from all obstruction or interference, the antenna being concealed so as not to mar the interior decorative appearance of the car. Thus, the radio receiving set may be conveniently carried about and is always ready for use, the control knobs being readily manipulated by the operator from his seat.

The installation as above described also permits building and using radio apparatus of capacities substantially larger than those usually constructed for portable use, said apparatus being adapted for distant as well as local service.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:—

1. In a portable radio device, the combination with the dashboard of a motor vehicle of a casing extending behind the dashboard and spaced a substantial distance from the floor-board of the vehicle, and a radio apparatus housed in said casing having its control members extending therefrom through said dashboard to the front thereof.

2. In a portable radio device, the combination with the dashboard of a motor vehicle of a casing extending behind the dashboard and spaced a substantial distance from the floor-board of the vehicle, and a radio apparatus housed in said casing having its control members extending therefrom through said dashboard to the front thereof, said casing having a closure adapted to be opened from the bottom for permitting easy access to said radio apparatus.

3. In a portable radio device, the combination with the dashboard of a motor vehicle of a casing extending behind the dashboard and spaced a substantial distance from the floor-board of the vehicle, and a radio apparatus housed in said casing arranged to be operated from the front of said dashboard, the interior of said casing being accessible from the bottom thereof.

4. In a portable radio device for an auto vehicle having a dashboard and electric power means, a casing extending behind the dashboard, a radio apparatus housed in said casing and connected for operation from said power means, said radio apparatus arranged to be operated from the front of said dashboard, and said casing being spaced a substantial distance from the floor-board of the vehicle and having a closure openable from the bottom of the casing for permitting easy access to said radio apparatus.

5. In a portable radio device for an auto vehicle having operating control devices, a dashboard for supporting the latter, a radio apparatus mounted on and extending behind said dashboard and having the operating controls thereof extending through said dashboard adjacent said vehicle controlling devices.

6. In a portable radio device for an auto vehicle, a dashboard having openings therein for the vehicle controlling devices, a radio apparatus mounted on and extending behind said dashboard with its operating controls extending through the dashboard to the front thereof, said dashboard having openings adapted to receive said radio operating controls positioned adjacent said first mentioned openings.

7. In a portable radio device, the combination with the dashboard of a motor vehicle, of a radio apparatus mounted on said dashboard to extend behind the latter and spaced a substantial distance from the floor-board of the vehicle, and having the control members thereof projected through said dashboard to the front side thereof, whereby the said radio apparatus may be operated from said dashboard without interfering with the normal manipulation of the vehicle operating controls and accessories.

8. In a portable radio device for an auto vehicle having a dashboard and electric power means, a radio apparatus mounted on said dashboard extending behind the latter and spaced a substantial distance from the floor-board of the vehicle, said radio apparatus connected for operation from said power means and arranged to be operated from the front of said dashboard.

In testimony whereof I affix my signature.

WILLIAM M. HEINA.